US006522399B1

(12) United States Patent
Lawrence et al.

(10) Patent No.: US 6,522,399 B1
(45) Date of Patent: Feb. 18, 2003

(54) SIGNATURE MARK RECOGNITION SYSTEMS

(75) Inventors: Christopher R Lawrence, Farnborough (GB); John R Sambles, Exeter (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/367,222

(22) PCT Filed: Feb. 11, 1998

(86) PCT No.: PCT/GB98/00420

§ 371 (c)(1),
(2), (4) Date: Aug. 11, 1999

(87) PCT Pub. No.: WO98/37514

PCT Pub. Date: Aug. 27, 1998

(30) Foreign Application Priority Data

Feb. 24, 1997 (GB) .......................................... 9703822

(51) Int. Cl.[7] .......................... G06K 9/74; G06K 5/00
(52) U.S. Cl. ....................................... 356/71; 250/556
(58) Field of Search ................... 356/71, 369; 250/556; 382/115, 116, 137; 700/215, 245, 253, 255

(56) References Cited

U.S. PATENT DOCUMENTS 4,661,983 A * 4/1987 Knop ............................ 382/1
4,662,653 A * 5/1987 Greenaway .................. 283/91
5,442,433 A * 8/1995 Hoshino et al. .............. 356/71
5,497,227 A * 3/1996 Takeuchhi et al. ............ 356/71
5,591,527 A * 1/1997 Lu .......................... 428/411.1
5,621,515 A * 4/1997 Hoshino et al. .............. 356/71
5,629,070 A * 5/1997 Korth ......................... 428/174

FOREIGN PATENT DOCUMENTS

EP 0 552 564 * 7/1993
EP 0 751 480 * 1/1997
WO WO 98 10324 * 3/1998

* cited by examiner

*Primary Examiner*—Zandra Smith
(74) *Attorney, Agent, or Firm*—Nixon & Vanderhye P.C.

(57) ABSTRACT

A signature recognition system for identifying an article with a distinctive diffraction element (or elements) and verifying the presence of that element or elements comprising: an article with one or more diffraction gratings impressed thereon, the grating(s) exhibiting periodic wave surface profiles having a depth-to-pitch ratio δ of between 0.1 and 0.5, a source of polarized electromagnetic radiation of wavelength λ such that the pitch G of the periodic wave surface profile of the grating(s) is comparable to an integer multiple n of that wavelength, a device for directing the source of polarized electromagnetic radiation to the surface of the grating(s) at a plane of incidence substantially normal to the plane of the surface of the diffraction grating and at an angle of approximately 45° azimuth to the alignment of the grooves on the surface, and a device for detecting radiation reflected from the grating(s) surface which is oppositely polarized to the incident radiation.

17 Claims, 4 Drawing Sheets

SINUSOIDALLY GROOVED METAL :
PITCH = 500nm
AZIMUTH = 45°
INCIDENT ANGLE = 0°

SIGNATURE MARK RECOGNITION SYSTEMS

BACKGROUND OF THE INVENTION

1. Field of the Invention

This invention relates to signature recognition systems for providing articles with distinctive signatures and means for verifying those signatures.

2. Discussion of Prior Art

Patent Application no. GB 2235287 B discloses an optical sensor based on the use of surface plasmon polaritons (SPP). The sensor comprises apparatus for detecting a surface plasmon-polariton resonance maximum which occurs following polarisation conversion of particular wavelengths of radiation incident upon a surface which correspond to the excitation of an SPP at or about its resonant frequency.

Bar code systems are well known as a means of distinguishing certain items and are easily read using light pens. As a two dimensional system, bar codes are easily distorted by smudges of dirt, creases, scratches and so on, this can cause errors in readings taken by a light pen. Furthermore, as they are visible to the naked eye, conventional bar code systems are fairly simple to copy or alter.

Magnetic strips and reading devices are also commonly used as a security measure for identifying personal identification cards, credit cards and the like. Like conventional optical bar codes, these strips are easily damaged by bending or scratching and can also be affected by close contact with other magnetic sources.

SUMMARY OF THE INVENTION

The present invention is a signature recognition system for identifying an article with a distinctive diffractive element (or elements) and verifying the presence of that element or elements comprising;

- an article with one or more diffraction gratings impressed thereon, the grating(s) exhibiting periodic wave surface profile having a depth-to-pitch ratio δ of between 0.1 and 0.5,
- a source of polarised electromagnetic radiation of wavelength λ such that the pitch G of the periodic wave surface profile of the grating(s) is comparable to an integer multiple n of that wavelength
- means for directing the source of polarised electromagnetic radiation to the surface of the grating(s) at a plane of incidence substantially normal to the plane of the surface of the diffraction grating and at an angle of approximately 45° azimuth to the alignment of the grooves on the surface of the diffraction grating, and
- means for detecting radiation reflected from the grating(s) surface which is oppositely polarised to the incident radiation.

DETAILED DISCUSSION OF EMBODIMENTS

Figure 1:
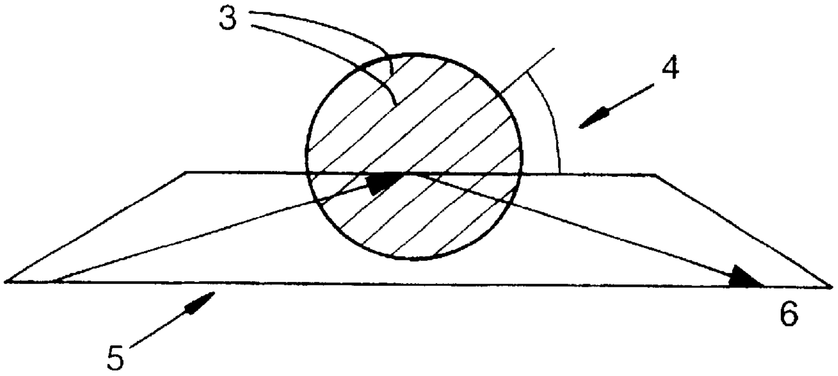
FIG. 1 is a schematic diagram showing the reflection of radiation which is oppositely polarised to the incident radiation.

It can be shown that when polarised electromagnetic radiation is directed to a suitably proportioned diffraction grating under the conditions described, the reflected radiation is oppositely polarised to the incident radiation. A schematic of these conditions is illustrated in FIG. 1 wherein a source of radiation (1) is made incident upon a grating (2) with grooves (3) aligned at azimuthal angle (4) to the plane of incidence (5). When the plane of incidence (5) is substantially normal to the grating surface (2), radiation of opposite polarisation (6) is reflected back along the plane of incidence (5).

The phenomenon is defined as polarisation conversion. Unlike GB 2235287 B the effect is dependent on diffractive surfaces that alter the polarisation state of incident radiation. This effect is due to the geometry of the surface, and can be exhibited by any suitably-profiled reflective material, the frequency range of operation being dictated by the dimensions of that profile. As the effect is dependent on a close relationship between the geometric surface profile of the grating and the wavelength of radiation incident upon it, detection of an oppositely polarised wavelength of radiation reflected from a grating or series of gratings is indicative of specific surface profile dimensions of a grating. Suitable such profiles include sinusoidal, square and triangular waves. Most preferred is the sine wave profile as this is likely to provide the greatest amount of polarisation conversion of the source with minimal dispersion effects.

The strongest polarisation-conversion effects can be obtained from a grooved reflective surface under the following conditions:

The grooves are aligned at 45 degrees to the plane of incidence (i.e. the azimuthal angle is 45 degrees).

The radiation is substantially normally incident upon the surface (i.e. the angle of incidence is said to be approximately zero).

The wavelength λ of the incident radiation is given by the expression:

$$G/n=\lambda$$

in which n is an integer and G is the pitch of the surface, i.e. the repeat period or in the specific case of a sinusoidal surface profile, the peak-to-peak separation.

Figure 2:
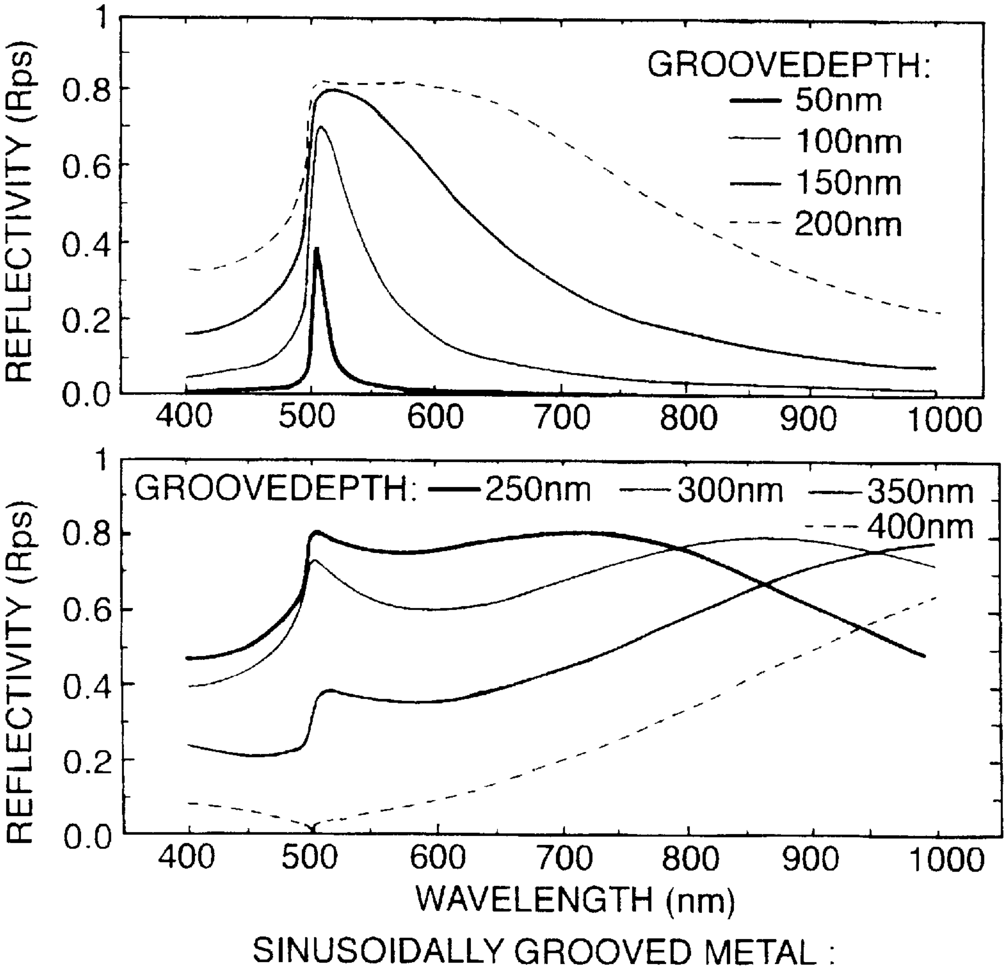
FIG. 2 illustrates graphs of reflectivity versus wavelength for different pitch-to-depth ratios.

The most efficient polarisation conversion effect occurs when n=1. FIG. 2 shows a plot of reflectivity versus wavelength for various pitch-to-depth ratios under the conditions described. As can be seen, the relationship between the depth-to-pitch ratio δ and the range of wavelengths which may undergo polarisation conversion can be broadly categorised as follows;

When the depth-to-pitch ratio δ (δ=d/G) is between ~0.1 and ~0.3, the polarisation-conversion is exhibited in a plot of reflectivity versus wavelength as a distinct peak.

When the depth-to-pitch ratio δ (δ=d/G) exceeds ~0.3, the peak broadens to longer wavelengths, producing a plateau in a plot of reflectivity versus wavelength.

In the former case the grating surfaces will exhibit a peak value of reflectivity, sufficient to enable a polychromatic reading device to distinguish between different diffractive elements. Such a grating surface will be useful where a very high degree of distinguishability is necessary between similar signatures.

Figure 3:
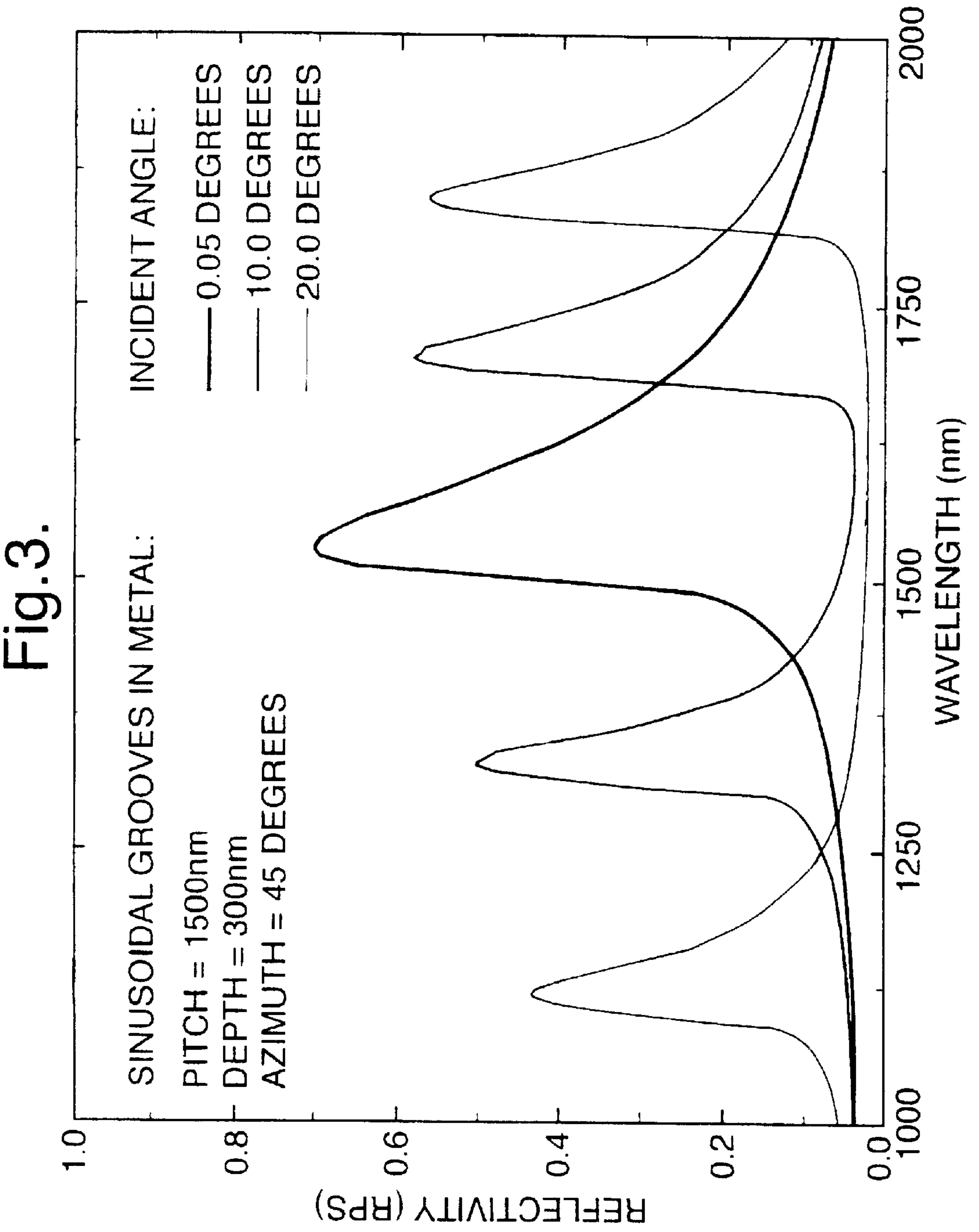
FIG. 3 is a graph of reflectivity versus wavelength for various incident angles.

FIG. 3 shows a plot of reflectivity versus wavelength for various incident angles under the conditions described. As can be seen from the Figure, as the angle of incidence is increased, the peak splits into two separate maxima that move to higher and lower wavelengths respectively as the angle increases. The peaks also decrease in efficiency as the angle of incidence increases. This effect will enable the utilisation of non-zero angles of incidence up to about 30 degrees.

In the latter of the above cases where the depth-to-pitch ratio $\delta$ ($\delta$=d/G) is between ~0.3 and ~0.5, a broader spectrum of wavelengths will be polarisation-converted by the grating surface, a feature that the skilled person will understand to be of use where the exact wavelength of the radiation source is poorly defined, or the intensity of the reflected signal needs to be increased by accessing a range of wavelengths from a broad-band source. A system employing such a grating would be useful where a larger margin of error must be allowed for, for instance in coding foodstuffs for transmission through supermarket checkouts where signatures need to be identified quickly and the diffractive grating cannot always be positioned accurately in relation to the radiation source.

Figure 4:
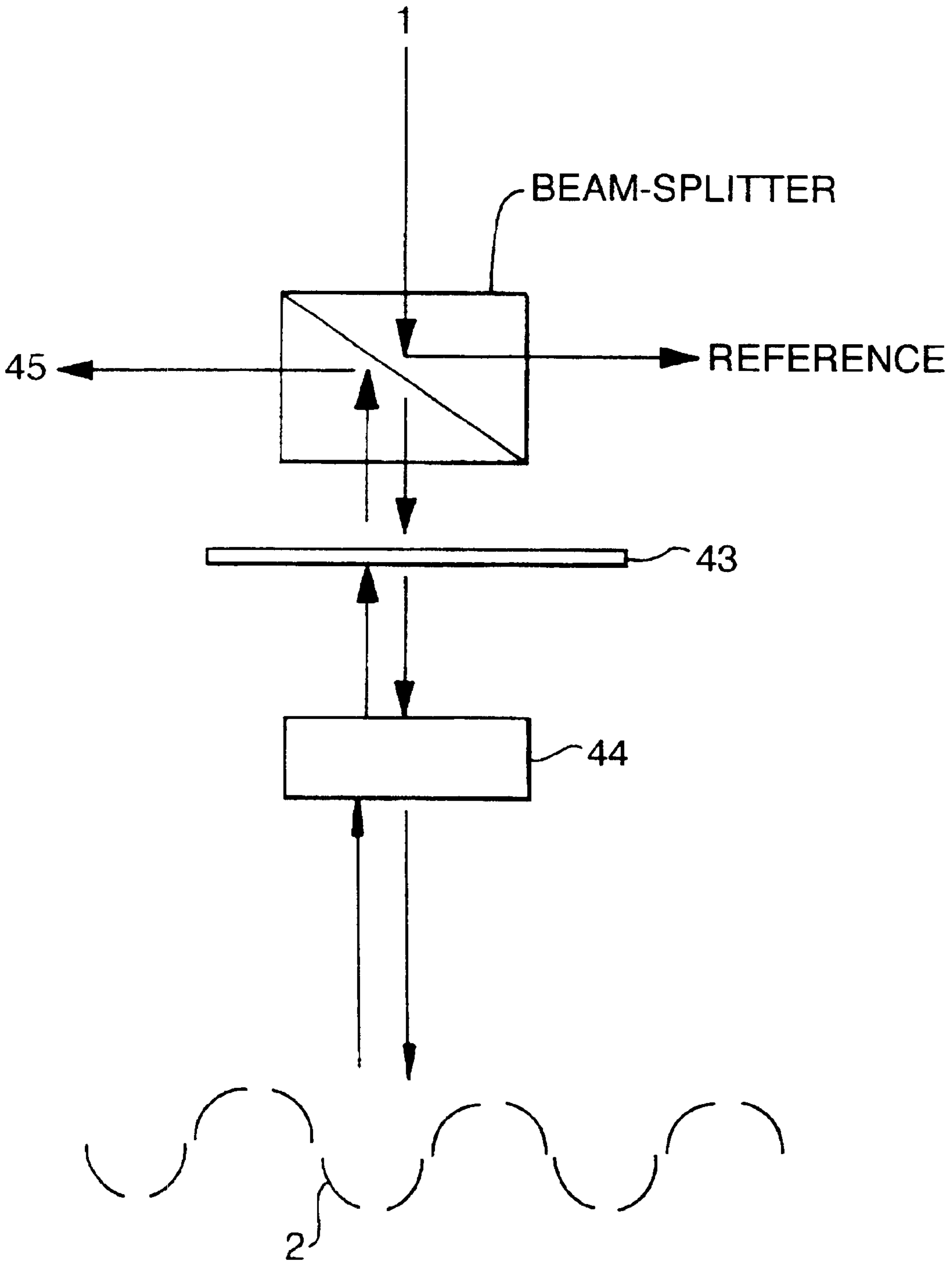
FIG. 4 is a schematic illustrating one embodiment of the present invention.

One convenient method of directing the source of electromagnetic radiation to the surface of the grating(s) in accordance with the invention is to use a circularly polarised source of the radiation. FIG. 4 illustrates such a system.

In FIG. 4, electromagnetic radiation from source (1) is positioned to direct the source in a direction substantially normal to the diffraction grating surface (2). The source-radiation first passes through a linear polariser 43, and then through a 90° phase-retardation plate 44, the combination of 43 and 44 acting as a circular polariser. The source then arrives at the diffraction grating surface (2) on the article under detection. Any part of the circularly polarised source which is incident to the grating at 45° azimuth will undergo polarisation conversion: the reflected beam can then be transmitted back through the circular polariser. If polarisation conversion did not occur (i.e. if the correctly-profiled grating was absent) then the reflected radiation would be rotating in a sense that would be opposed to that of the polariser, and transmission could not occur. The reflected radiation will therefore only produce a signal at the detector 45 if the surface exhibits specifically-tailored diffractive properties.

In one particular embodiment of the invention a series of gratings are impressed on a card, for instance, a credit card or security identification card. The gratings may be of the same profile and spaced apart or may be of the same orientation but with surface profiles of different dimensions. Thus various combinations of gratings can produce unique identification codes for users of personal credit or security cards.

In the simplest case, a monochromatic light source is polarised and placed above an appropriate grating or series of gratings. A suitable light detector is covered with an oppositely-aligned polariser. The radiation emitted from the source will then be reflected from the grating surface at near-normal incidence, and a signal will be detected only if polarisation conversion has occurred. Thus a binary code can be provided with gratings causing intermittent polarisation conversion along a series of gratings. A further level of differentiation between codes can be provided by varying the widths of a series of similar gratings providing an effect much like that of conventional optical bar codes. Optionally a conventional optical bar code could be imprinted onto a continuous diffraction grating to provide this effect. In the latter two cases, existing bar code reading equipment could be readily modified to read the codes of the present invention by placing opposing polarisers over the existing light sources and detectors.

The polarisation conversion effect is so surface specific that most surfaces will not produce any signal at all (and almost certainly not of the correct wavelength in the case of a polychromatic source of radiation) and hence small damaged areas of a grating will merely reduce the total magnitude of the signal detected rather than produce spurious signals, thus the scope for error in readings is much reduced over conventional systems.

If a polychromatic radiation source is used then the wavelength producing the most intense polarisation converted signal could be detected. It follows from this that a series of gratings designed to produce the effect at different wavelengths could be distinguished. By varying the arrangement of gratings of differing wavelength polarisation conversion characteristics, individual cards can be given unique identification codes. Again the gratings could be spaced apart and/or of varying lengths to provide a further discriminating feature in the code.

Figure 5A:
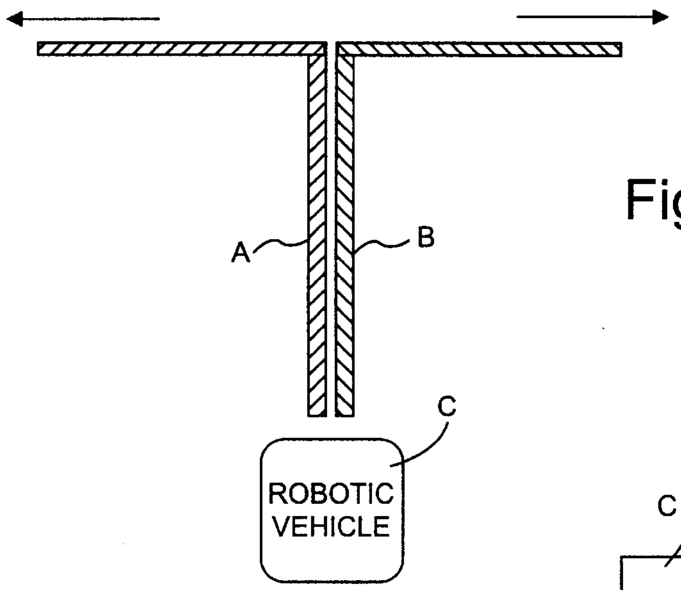
FIGS. 5*a* and 5*b* are top and side views, respectively, of one embodiment of the present invention.
Figure 5B:
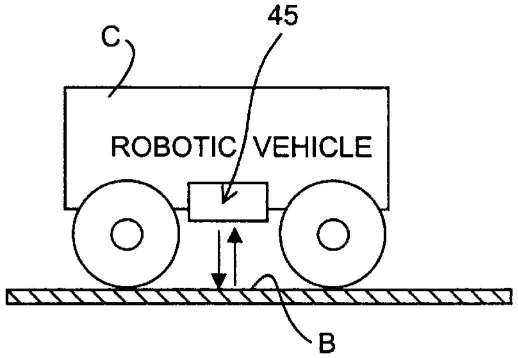

An alternative embodiment is shown in FIGS. 5*a* and 5*b*. A pattern of gratings A and B according to the present invention are provided along tracks to be followed by, for instance, a robot vehicle C. The robot could be programmed to follow a particular pattern or to turn or stop on recognising other patterns.

As the gratings are necessarily three dimensional and their dimensions are in the sub-nanometric range, they become very difficult to copy or alter. To prevent reduction in signal magnitudes resulting from dirty or scratched grating surfaces, the gratings could be coated with dielectric materials.

A further degree of resolution can be obtained by placing two detection devices in parallel, one detecting polarisation converted reflections, the other detecting remaining reflections. A comparison of the two detected signals provides a higher resolution measurement of the polarisation converted radiation.

Figure 6:
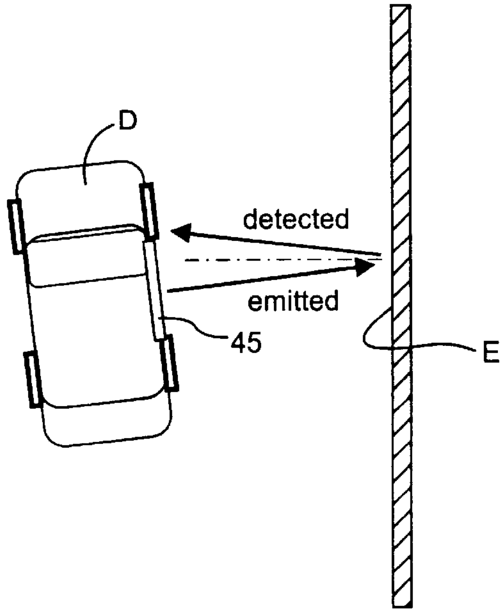
FIG. 6 is a top view of a further embodiment of the present invention.

Whilst it is envisaged that the use of optical or infrared componentry would be most convenient for the embodiments so far described (primarily due to the size of the equipment required), an alternative embodiment uses larger gratings and higher wavelength radiation such as microwaves. As the effect is angle specific as well as surface geometry dependent, the device lends itself to use as a micro-positioning device. Signals generated by moving devices are detected only when the devices are near parallel to the grating. For instance, as shown in FIG. 6, this effect could be used in the design of automatic radar for keeping road vehicles D in lanes via road side barriers with gratings E which detect when the vehicles are within their range.

What is claimed is:

1. A signature recognition system for identifying an article with at least one distinctive diffractive element and verifying the presence of said element comprising:

an article with at least one diffraction grating impressed thereon, the grating exhibiting periodic wave surface profiles having a depth-to-pitch ratio $\delta$ of between 0.1 and 0.5, a source of polarised electromagnetic radiation of wavelength $\lambda$ such that the pitch G of the periodic wave surface profile of the grating is comparable to an integer multiple n of that wavelength, means for directing the source of polarised electromagnetic radiation to the surface of the grating at a plane of incidence substantially normal to the plane of the surface of the diffraction grating and at an angle of approximately 45° azimuth to the alignment of the grooves on the surface, and means for detecting radiation reflected from the grating surface which is oppositely polarised to the incident radiation.

2. A signature recognition system as claimed in claim 1 wherein the source of polarised electromagnetic radiation is circularly polarised.

3. A signature recognition system as claimed in claim 1 wherein the source of polarised radiation is plane polarised.

4. A signature recognition system as claimed in claim 1 wherein a series of gratings with surface profiles of similar dimension are spaced apart at intervals to form an identifiable pattern.

5. A signature recognition system as claimed in claim 4 wherein the gratings are of differing width.

6. A signature recognition system as claimed in claim 4 wherein the source of electromagnetic radiation is light.

7. A signature recognition system as claimed in claim 1 wherein a series of gratings with surface profiles of differing dimensions are impressed on the article and the source of electromagnetic radiation is polychromatic.

8. A signature recognition system as claimed in claim 7 wherein the gratings are of differing length.

9. A signature recognition system as claimed in claim 1 wherein the article is a credit card or security identification card.

10. A signature recognition system as claimed in claim 1 wherein the wave surface profile is a sine wave.

11. A signature recognition system as claimed in claim 1 wherein the grating surface is coated with a dielectric material.

12. A signature recognition system as claimed in claim 1 wherein the grating surface has a depth to pitch ratio of between 0.1 and 0.3.

13. A signature recognition system as claimed in claim 1 wherein the grating surface has a depth to pitch ratio of between 0.3 and 0.5.

14. A signature recognition system for identifying an article with a distinctive diffractive element (or elements) and verifying the presence of that element or elements comprising:

an article with one or more diffraction gratings impressed thereon, the grating(s) exhibiting periodic wave surface profiles having a depth-to-pitch ratio $\delta$ of between 0.1 and 0.5, a source of polarised electromagnetic radiation of wavelength $\lambda$ such that the pitch G of the periodic wave surface profile of the grating(s) is comparable to an integer multiple n of that wavelength, means for directing the source of polarised electromagnetic radiation to the surface of the grating(s) at a plane of incidence substantially normal to the plane of the surface of the diffraction grating and at an angle of approximately 45° azimuth to the alignment of the grooves on the surface, and means for detecting radiation reflected from the grating(s) surface which is oppositely polarised to the incident radiation, wherein a series of gratings with surface profiles of differing dimensions are impressed on the article and the source of electromagnetic radiation is polychromatic, wherein the gratings are spaced apart at intervals to form an identifiable pattern.

15. A signature recognition system for identifying an article with a distinctive diffractive element (or elements) and verifying the presence of that element or elements comprising:

an article with one or more diffraction gratings impressed thereon, the grating(s) exhibiting periodic wave surface profiles having a depth-to-pitch ratio $\delta$ of between 0.1 and 0.5, a source of polarised electromagnetic radiation of wavelength $\lambda$ such that the pitch G of the periodic wave surface profile of the grating(s) is comparable to an integer multiple n of that wavelength, means for directing the source of polarised electromagnetic radiation to the surface of the grating(s) at a plane of incidence substantially normal to the plane of the surface of the diffraction grating and at an angle of approximately 45° azimuth to the alignment of the grooves on the surface, and means for detecting radiation reflected from the grating(s) surface which is oppositely polarised to the incident radiation, wherein the article comprises a track and the detector comprises a robotic vehicle programmed to follow the track.

16. A signature recognition system for identifying an article with a distinctive diffractive element (or elements) and verifying the presence of that element or elements comprising:

an article with one or more diffraction gratings impressed thereon, the grating(s) exhibiting periodic wave surface profiles having a depth-to-pitch ratio $\delta$ of between 0.1 and 0.5, a source of polarised electromagnetic radiation of wavelength $\lambda$ such that the pitch G of the periodic wave surface profile of the grating(s) is comparable to an integer multiple n of that wavelength, means for directing the source of polarised electromagnetic radiation to the surface of the grating(s) at a plane of incidence substantially normal to the plane of the surface of the diffraction grating and at an angle of approximately 45° azimuth to the alignment of the grooves on the surface, and means for detecting radiation reflected from the grating(s) surface which is oppositely polarised to the incident radiation, wherein the article comprises road side barrier devices and the detector comprises a road vehicle.

17. A signature recognition system as claimed in claim 16 wherein the source of electromagnetic radiation is in the microwave range.

* * * * *